J. CORCORAN.
CORN PLANTER.
APPLICATION FILED APR. 21, 1913.
1,093,978.
Patented Apr. 21, 1914.
2 SHEETS—SHEET 1.
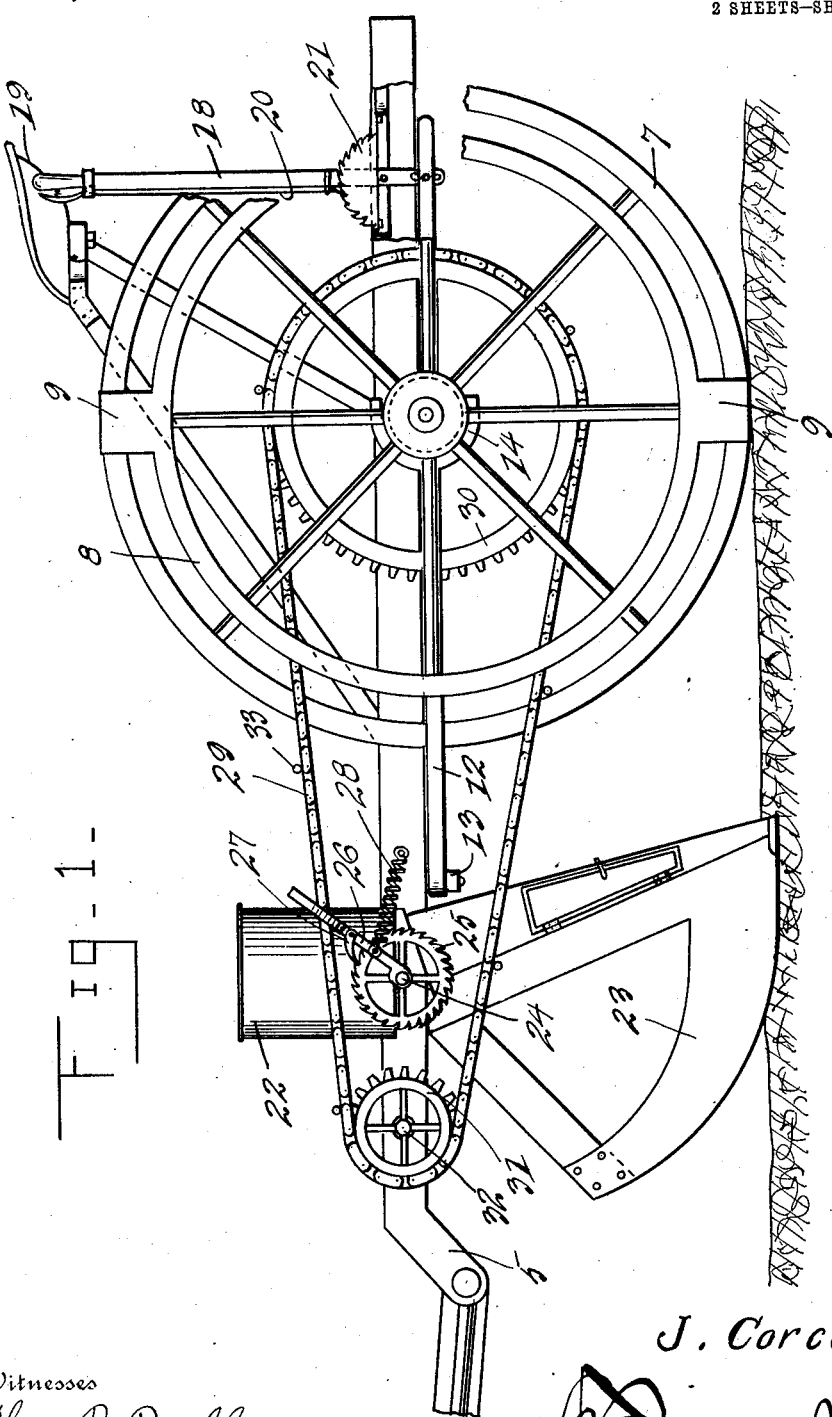
Witnesses
Chas. R. Bealle.
E. H. Jester
Inventor
J. Corcoran
By
Attorney

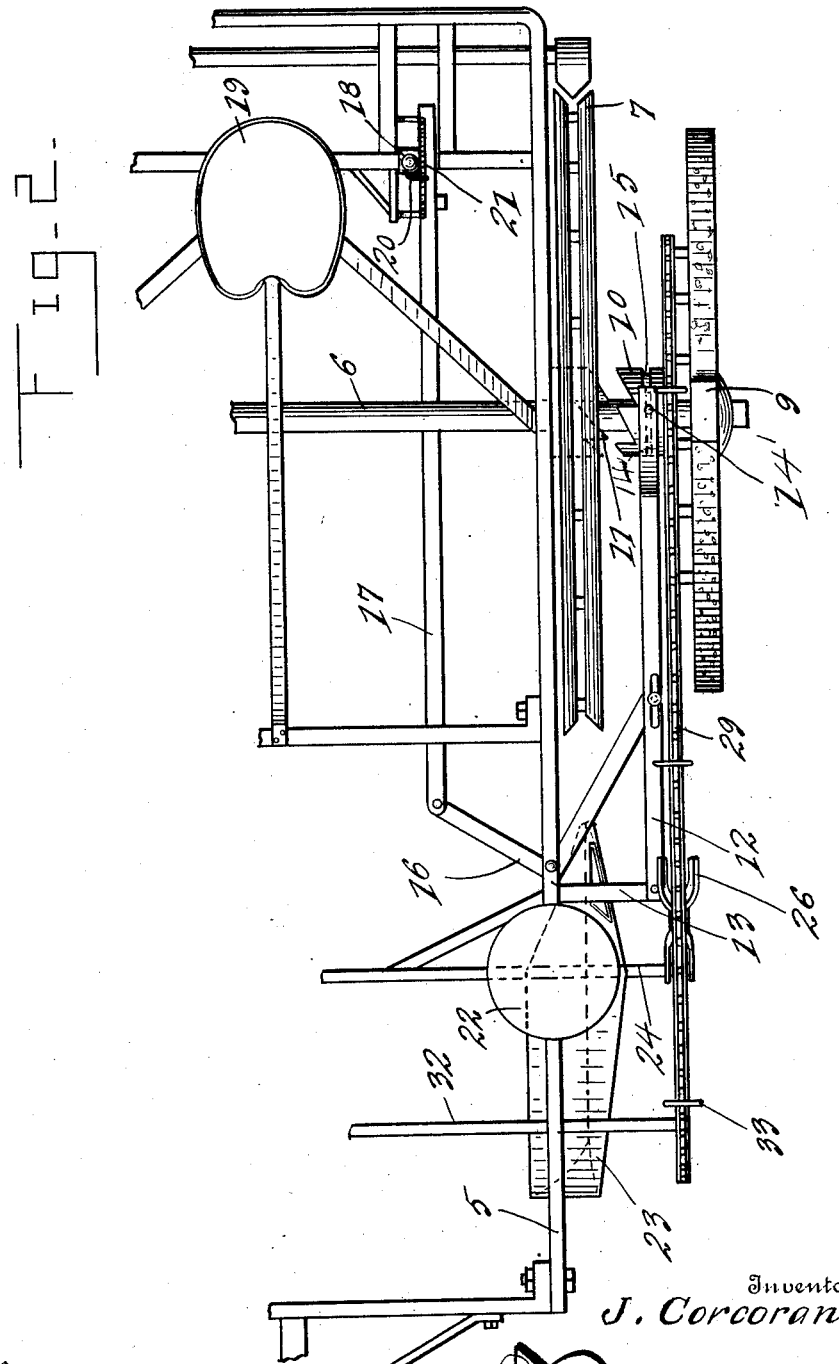

UNITED STATES PATENT OFFICE.

JOHN CORCORAN, OF CHICAGO, ILLINOIS, ASSIGNOR OF ONE-HALF TO JUSTUS LAUN, OF CHICAGO, ILLINOIS.

CORN-PLANTER.

1,093,978.  Specification of Letters Patent.  Patented Apr. 21, 1914.

Application filed April 21, 1913. Serial No. 762,599.

*To all whom it may concern:*

Be it known that I, JOHN CORCORAN, a citizen of the United States, residing at Chicago, in the county of Cook and State of Illinois, have invented certain new and useful Improvements in Corn-Planters; and I do hereby declare the following to be a full, clear, and exact description of the invention, such as will enable others skilled in the art to which it appertains to make and use the same.

This invention comprehends improvements in seed planters, and relates more particularly to those which are especially adapted for planting corn.

The primary object of the invention resides in the provision of a planter of this type, which shall be of extremely simple construction, cheap to manufacture, and easy to operate.

Another and more specific object of the invention is to provide a check row corn planter having a marker wheel which may be easily thrown into and out of gear, and having novel means for actuating the discharge valve which feeds grain into the shoe.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation, partly broken away, of my improved corn planter, and, Fig. 2 is a fragmentary top plan view, showing one side of my improved planter.

Referring in detail to the drawing by numerals, 5 designates the frame of the planter, which is supported upon a revoluble axle 6, having the ground wheels 7, rigidly secured thereto. A marker wheel 8 of a smaller diameter than the drive wheels 7, is slidably and rotatably mounted upon each end of the axle 6 upon the outside of the adjacent drive wheel. A pair of markers 9 are formed upon each of the marker wheels and are of such length as to form depressions in the ground as they come in contact therewith. A clutch member 10 is rigidly secured to each of the marker wheels and is adapted to engage a clutch member 11, which is rigidly secured to the axle 6, whereby a rotational movement is transmitted to the marker wheels.

To provide for throwing the clutch members into and out of gear, I provide a shift lever 12, which is pivoted at its forward end to a bracket 13, extending from the frame 5 and which has a yoke 14 formed upon its inner end, that partly encircles the clutch member 10 and which is connected thereto by means of pins 14' which seat within an annular recess 15. A bell crank lever 16 is pivoted to the frame 5 and is slidably connected at one end to the shift rod 12 and pivotally connected at its other end to the connecting rod 17. This connecting rod extends rearwardly and is connected to a hand lever 18, which extends upwardly in close proximity to the seat 19. The hand operated lever may be locked in various positions by means of the latch rod 20 engaging the toothed segment 21.

A hopper 22 is mounted upon each side of the frame adjacent the forward end directly over a shoe 23 and a valve rod 24 extends through each of these hoppers for simultaneously operating the valves therein. A ratchet wheel 25 is secured to one extremity of the valve rod and an arm 27, forked at each end, is also secured to one extremity of the valve rod and extends on each side of the ratchet wheel. The arm 26 carries a pivoted pawl 27 which engages the teeth of the ratchet wheel, whereby the latter may be rotated in one direction. A contractile spiral spring 28 holds the arm 26 normally in the position shown in Fig. 1.

To provide for actuating the arm 26 in order that corn may be discharged into the shoe 23, I provide a sprocket chain 29 which is driven by a large sprocket wheel 30 carried by the marker wheel 8 and which runs over a smaller sprocket wheel 31 secured to a shaft 32. The upper lead of the sprocket chain passes between the forked upper extremities of the arm 26 and brings the trip pins 33 into engagement with said arm, whereby the same is swung forwardly so as to operate the valves.

In operation, the marker wheel may be thrown into operation by a rearward movement of the upper extremity of the hand operated lever 18 and held thus by means of the latch rod 20. As the planter travels over the field the sprocket chain 29 is driven and brings the pins 33 successively into engagement with the arm 26 so that the arm is caused to oscillate and discharge corn into the shoe 23. Since the ground wheel 7 will cut into the surface of the field a slight distance the markers 9 will be brought into engagement with the field and serve to mark the spots at which the corn has been dropped.

From the foregoing description taken in connection with the accompanying drawings, it will be seen that I have provided a very simply constructed corn planter which includes a marker wheel and valve operating mechanism that may be simultaneously thrown into and out of engagement by a movement of the hand operated lever.

It is to be understood that while I have shown and described the preferred embodiment of my invention, I do not wish to be limited to this exact construction, combination, and arrangement of parts, but may make such changes as will fall within the spirit and scope of the invention as claimed.

Having thus described my invention, what I claim is:—

1. In a corn planter a frame, an axle, ground wheels rigidly secured to said axle, a clutch member rigid with the axle, a sprocket wheel loosely mounted on the axle, a clutch member carried by said sprocket wheel, means for engaging the two said clutch members, an idler sprocket wheel journaled in the plane of first mentioned sprocket wheel, a chain running around said sprocket wheels, seed dropping mechanism including a rotatable valve rod projecting between the leads of said chain, a ratchet wheel rigidly secured to said valve rod between the leads of the chain, an arm forked at each end, the forks at one end of the arm straddling the ratchet wheel and loosely connected with the valve rod, a pawl pivoted to said arm and engaging the teeth of the ratchet wheel, trip bars carried by said chain for engagement with the free fork of said arm, whereby the arm is swung in one direction and spring means for returning the arm to its normal position when disengaged from the trip bars.

2. In a corn planter of the character described a seed hopper, seed dropping mechanism including a rotatable valve rod disposed in a horizontal plane, a ratchet wheel rigid with said rod, an arm forked at each end, the forks at one end of the arm straddling the ratchet wheel loosely connected with the valve rod, a pawl pivoted to said arm and engaging the teeth of the ratchet wheel, a chain running through the forks on the free end of the arm, trip bars carried by said chain for engagement with the last mentioned forks whereby the arm is swung forwardly to turn the valve rod, and spring means for returning the arm to its normal position when disengaged from the trip bars.

In testimony whereof I affix my signature in presence of two witnesses.

JOHN CORCORAN.

Witnesses:
JOSEPH ALONZO WERT,
HENRY LINDERMANN.

---

Copies of this patent may be obtained for five cents each, by addressing the "Commissioner of Patents, Washington, D. C."